(12) United States Patent
Vanbrabant et al.

(10) Patent No.: US 8,794,407 B2
(45) Date of Patent: Aug. 5, 2014

(54) VELOCITY PROGRESSIVE VALVING

(75) Inventors: Ronny Vanbrabant, Heusden-Zolder (BE); Bert Diels, Nijlen (BE); Jean-Marie Tuts, Wellen (BE); Vincent Bailly, Rue du Duc (BE); Kristoff Six, Veldmansbrugstraat (BE)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 490 days.

(21) Appl. No.: 12/620,618

(22) Filed: Nov. 18, 2009

(65) Prior Publication Data

US 2011/0114428 A1 May 19, 2011

(51) Int. Cl.
*F16F 9/34* (2006.01)

(52) U.S. Cl.
USPC ............. 188/322.15; 188/282.1; 188/282.5; 188/282.6; 188/315; 188/317; 188/322.13

(58) Field of Classification Search
CPC ............ F16F 9/44; F16F 9/341; F16F 9/348; F16F 9/468; F16F 9/512; F16F 9/516; F16F 9/3214; F16F 9/3484; F16F 9/3485; F16F 9/3405
USPC ............................... 188/322.15, 282.1, 282.6
See application file for complete search history.

(56) References Cited

U.S. PATENT DOCUMENTS

| | | | |
|---|---|---|---|
| 3,845,782 A | 11/1974 | Nicholls et al. | |
| 4,624,347 A | 11/1986 | Mourray | |
| 4,749,068 A | 6/1988 | Sirven | |
| 5,042,624 A * | 8/1991 | Furuya et al. | 188/280 |
| 5,113,980 A | 5/1992 | Furrer et al. | |
| 5,220,983 A | 6/1993 | Furrer et al. | |
| 5,293,971 A * | 3/1994 | Kanari et al. | 188/282.1 |
| 5,316,113 A | 5/1994 | Yamaoka | |
| 5,413,195 A * | 5/1995 | Murakami | 188/282.6 |
| 5,507,371 A | 4/1996 | Takahashi | |
| 5,529,154 A | 6/1996 | Tanaka | |
| 5,586,627 A | 12/1996 | Nezu et al. | |
| 5,615,756 A | 4/1997 | Grundei et al. | |
| 5,738,190 A | 4/1998 | Deferme | |
| 5,937,976 A | 8/1999 | Grundei | |
| 6,035,979 A | 3/2000 | Förster | |
| 6,129,005 A | 10/2000 | Asadi et al. | |
| 6,148,969 A | 11/2000 | Lemmens | |

(Continued)

FOREIGN PATENT DOCUMENTS

| | | | | | |
|---|---|---|---|---|---|
| JP | 03157533 A | * | 7/1991 | | F16F 9/348 |
| JP | 06185562 | * | 7/1994 | | |
| JP | 08261268 A | * | 10/1996 | | F16F 9/32 |

OTHER PUBLICATIONS

International Search Report from corresponding PCT Application No. PCT/US2010/056838 dated Jul. 8, 2011.

*Primary Examiner* — Robert A Siconolfi
*Assistant Examiner* — San Aung
(74) *Attorney, Agent, or Firm* — Harness, Dickey & Pierce, P.L.C.

(57) ABSTRACT

A shock absorber has a valve assembly having a valve that is biased away from a valve body. A controlled restriction is defined between the valve and the valve body. During stroking of the piston of the shock absorber, the valve moves toward the valve body to close the restriction. The valve assembly can be used in the piston assembly, the base valve assembly or both.

20 Claims, 15 Drawing Sheets

(56) References Cited

U.S. PATENT DOCUMENTS

| | | | |
|---|---|---|---|
| 6,276,498 B1 * | 8/2001 | Kirchner | 188/282.5 |
| 6,336,536 B1 | 1/2002 | Fenn et al. | |
| 6,540,052 B2 | 4/2003 | Fenn et al. | |
| 6,581,734 B2 | 6/2003 | Heyn et al. | |
| 6,668,986 B2 | 12/2003 | Moradmand et al. | |
| 6,749,177 B2 | 6/2004 | Handke et al. | |
| 6,863,277 B2 | 3/2005 | Wirth et al. | |
| 2008/0185246 A1 * | 8/2008 | Park | 188/322.15 |

\* cited by examiner

VELOCITY PROGRESSIVE VALVING

FIELD

The present disclosure relates to automotive shock absorbers. More particularly, the present disclosure relates to valve assemblies incorporated into the shock absorber which control the damping characteristics for the shock absorber using velocity progressive valving.

BACKGROUND

The statements in this section merely provide background information related to the present disclosure and may not constitute prior art.

Shock absorbers are used in conjunction with automotive suspension systems and other suspension systems to absorb unwanted vibrations which occur during movement of the suspension system. In order to absorb these unwanted vibrations, automotive shock absorbers are generally connected between the sprung (body) and the unsprung (suspension/chassis) masses of the vehicle.

The most common type of shock absorbers for automobiles is the dashpot type which can be either a mono-tube design or a dual-tube design. In the mono-tube design, a piston is located within a pressure tube and is connected to the sprung mass of the vehicle through a piston rod. The pressure tube is connected to the unsprung mass of the vehicle. The piston divides the pressure tube into an upper working chamber and a lower working chamber. The piston includes compression valving which limits the flow of damping fluid from the lower working chamber to the upper working chamber during a compression stroke and rebound valving which limits the flow of damping fluid from the upper working chamber to the lower working chamber during a rebound or extension stroke. Because the compression valving and the rebound valving have the ability to limit the flow of damping fluid, the shock absorber is able to produce a damping force which counteracts the vibrations which would otherwise be transmitted from the unsprung mass to the sprung mass.

In a dual-tube shock absorber, a fluid reservoir is defined between the pressure tube and a reservoir tube which is positioned around the pressure tube. A base valve assembly is located between the lower working chamber and the fluid reservoir to control the flow of dampening fluid. The compression valving of the piston is moved to the base valve assembly and is replaced in the piston by a compression check valve assembly. In addition to the compression valving, the base valve assembly includes a rebound check valve assembly. The compression valving of the base valve assembly produces the damping force during a compression stroke, and the rebound valving of the piston produces the damping force during a rebound or extension stroke. Both the compression and rebound check valve assemblies permit fluid flow in one direction, but prohibit fluid flow in an opposite direction; however, they are designed such that they do not generate a damping force.

The valve assemblies for the shock absorber have the function of controlling oil flow between two chambers during the stroking of the shock absorber. By controlling the oil flow between the two chambers, a pressure drop is build up between the two chambers and this contributes to the damping forces of the shock absorber. The valve assemblies can be used to tune the damping forces to control ride and handling as well as noise, vibration and harshness.

SUMMARY

The present disclosure is directed to a shock absorber which includes velocity progressive valving for the valve assemblies of the shock absorber. The valve assemblies are designed to achieve a damping specification where the polynomial degree is higher than two. The valving system progressively closes the valve with the pressure action of the damping fluid.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DESCRIPTION

The following description is merely exemplary in nature and is not intended to limit the present disclosure, application, or uses.

Figure 1:
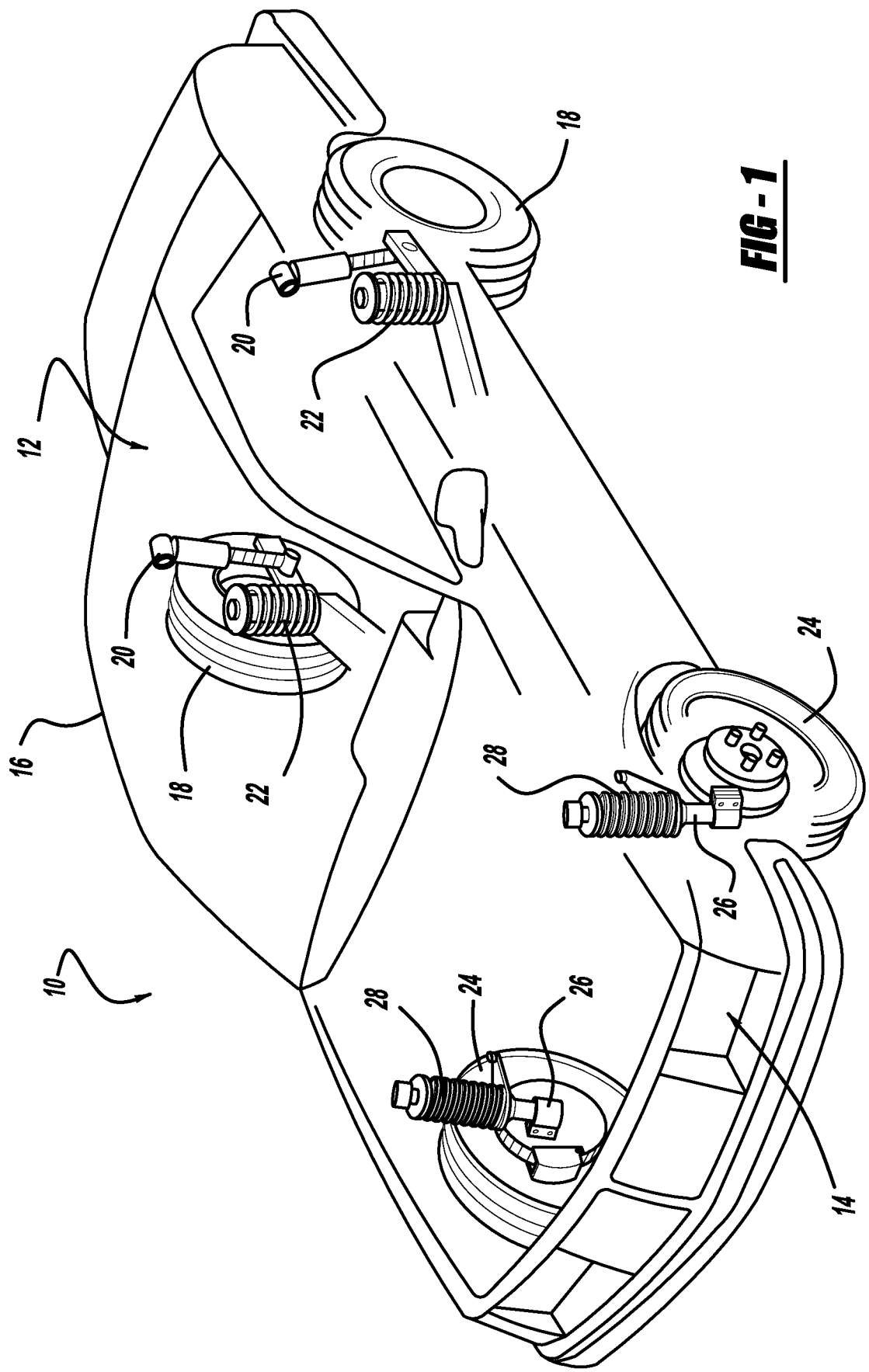
FIG. 1 is a schematic representation of a typical automobile which incorporates the velocity progressive valving in accordance with the present disclosure.

Referring now to the drawings in which like reference numerals designate like or corresponding parts throughout the several views, there is shown in FIG. 1 a vehicle which includes a suspension system incorporating the unique shock absorbers in accordance with the present disclosure and which is designated generally by the reference numeral 10. Vehicle 10 includes a rear suspension 12, a front suspension 14 and a body 16. Rear suspension 12 has a transversely extending rear axle assembly (not shown) adapted to operatively support a pair of rear wheels 18 of vehicle 10. The rear axle assembly is operatively connected to body 16 by means of a pair of shock absorbers 20 and a pair of helical coil springs 22. Similarly, front suspension 14 includes a transversely extending front axle assembly (not shown) to operatively support a pair of front wheels 24 of vehicle 10. The front axle assembly is operatively connected to body 16 by means of a second pair of shock absorbers 26 and by a pair of helical coil springs 28. Shock absorbers 20 and 26 serve to dampen the relative motion of the unsprung mass (i.e., front and rear suspensions 12 and 14, respectively) and the sprung mass (i.e., body 16) of vehicle 10. While vehicle 10 has been depicted as a passenger car having front and rear axle assemblies, shock absorbers 20 and 26 may be used with other types of vehicles or in other types of applications such as vehicles incorporating independent front and/or independent rear suspension systems. Further, the term "shock absorber" as used herein is meant to refer to dampers in general and thus will include MacPherson struts.

Figure 2:
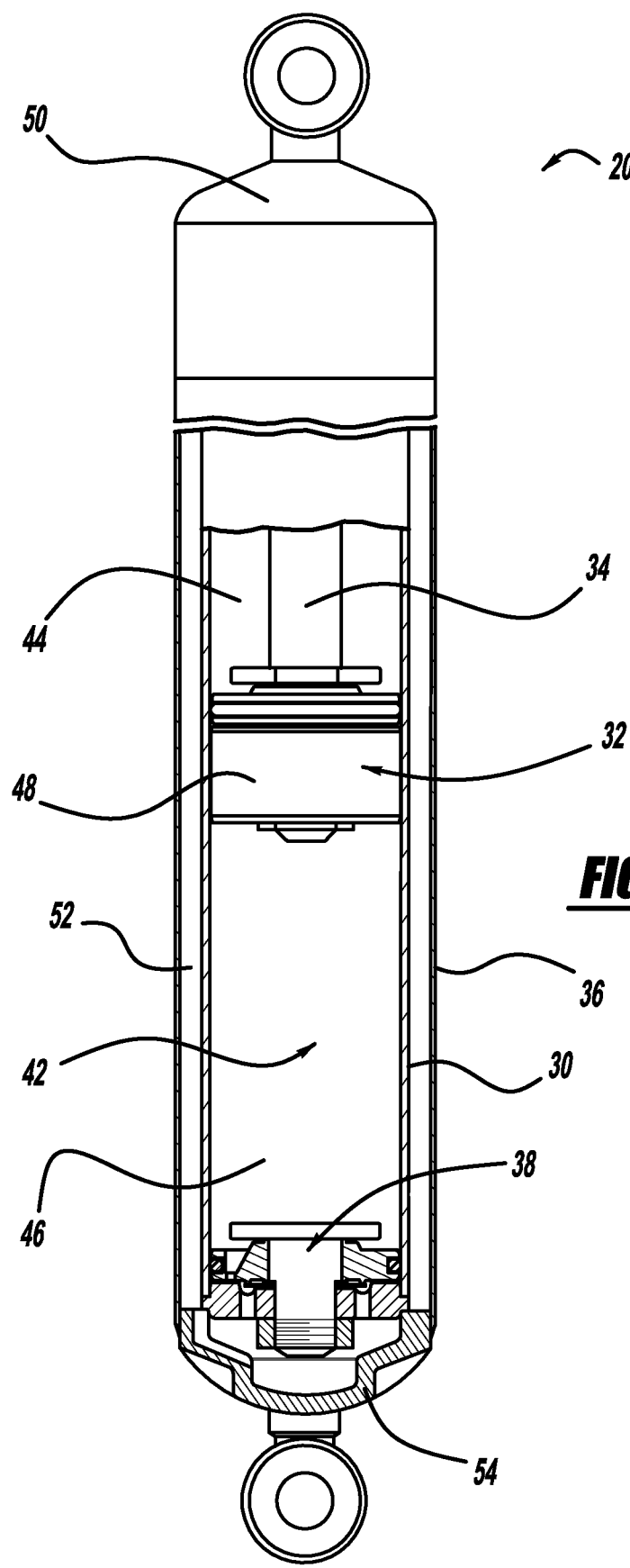
FIG. 2 is a side sectional view of the shock absorber in accordance with the present disclosure.

Referring now to FIG. 2, shock absorber 20 is shown in greater detail. While FIG. 2 illustrates only shock absorber 20, it is to be understood that shock absorber 26 also includes the unique valve assembly described below for shock absorber 20. Shock absorber 26 only differs from shock absorber 20 in the manner in which it is adapted to be connected to the sprung and unsprung masses of vehicle 10. Shock absorber 20 comprises a pressure tube 30, a piston assembly 32, a piston rod 34, a reservoir tube 36 and a base valve assembly 38.

Pressure tube 30 defines a working chamber 42. Piston assembly 32 is slidably disposed within pressure tube 30 and divides working chamber 42 into an upper working chamber 44 and a lower working chamber 46. A seal 48 is disposed between piston assembly 32 and pressure tube 30 to permit sliding movement of piston assembly 32 with respect to pressure tube 30 without generating undue frictional forces as well as sealing upper working chamber 44 from lower working chamber 46. Piston rod 34 is attached to piston assembly 32 and extends through upper working chamber 44 and through an upper end cap 50 which closes the upper end of pressure tube 30. A sealing system seals the interface between upper end cap 50, reservoir tube 36 and piston rod 34. The end of piston rod 34 opposite to piston assembly 32 is adapted to be secured to the sprung portion of vehicle 10. Valving within piston assembly 32 controls the movement of fluid between upper working chamber 44 and lower working chamber 46 during movement of piston assembly 32 within pressure tube 30. Because piston rod 34 extends only through upper working chamber 44 and not lower working chamber 46, movement of piston assembly 32 with respect to pressure tube 30 causes a difference in the amount of fluid displaced in upper working chamber 44 and the amount of fluid displaced in lower working chamber 46. The difference in the amount of fluid displaced is known as the "rod volume" and it flows through base valve assembly 38.

Reservoir tube 36 surrounds pressure tube 30 to define a fluid reservoir chamber 52 located between tubes 30 and 36. The bottom end of reservoir tube 36 is closed by an end cap 54 which is adapted to be connected to the unsprung portion of vehicle 10. The upper end of reservoir tube 36 is attached to upper end cap 50. Base valve assembly 38 is disposed between lower working chamber 46 and reservoir chamber 52 to control the flow of fluid between chambers 46 and 52. When shock absorber 20 extends in length, an additional volume of fluid is needed in lower working chamber 46 due to the "rod volume" concept. Thus, fluid will flow from reservoir chamber 52 to lower working chamber 46 through base valve assembly 38 as detailed below. When shock absorber 20 compresses in length, an excess of fluid must be removed from lower working chamber 46 due to the "rod volume" concept. Thus, fluid will flow from lower working chamber 46 to reservoir chamber 52 through base valve assembly 38 as detailed below.

Figure 3:
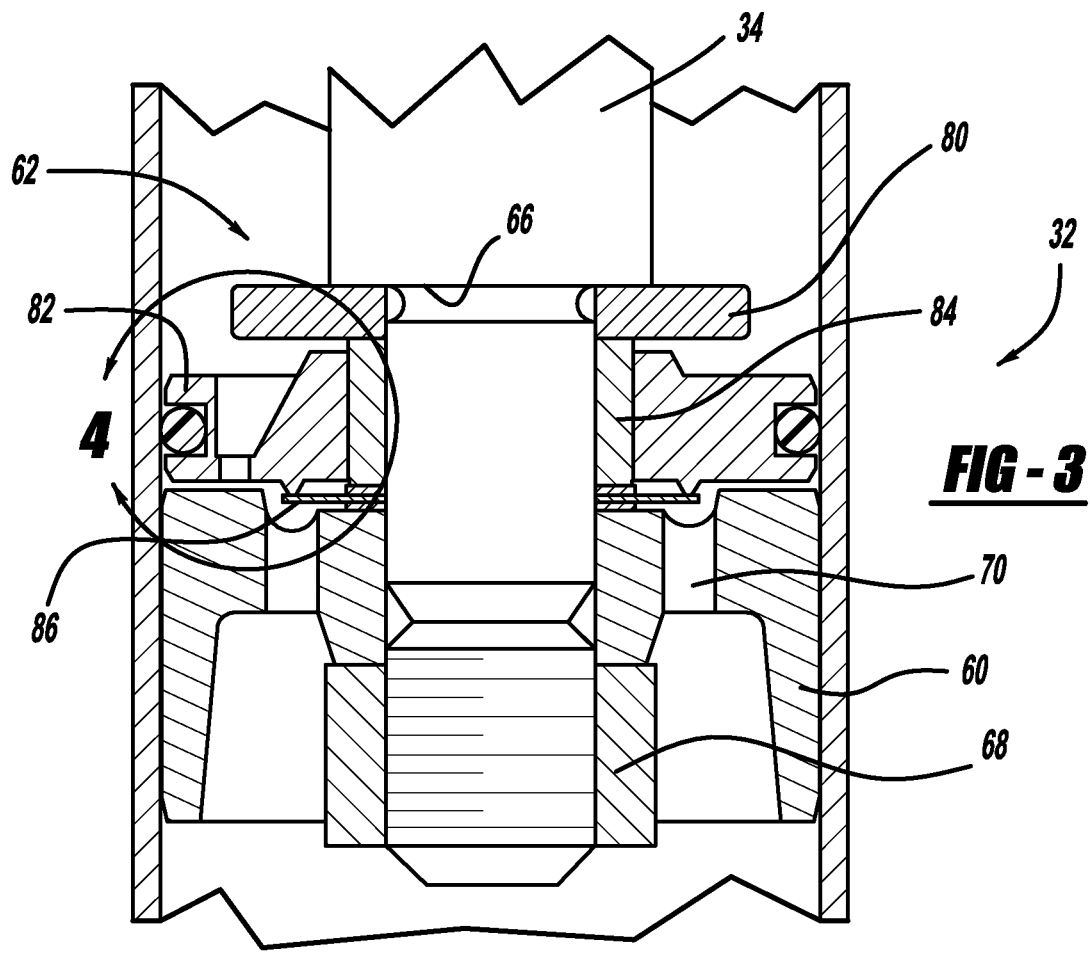
FIG. 3 is an enlarged cross-sectional view of the piston assembly in accordance with the present disclosure.

Referring now to FIG. 3, piston assembly 32 comprises a valve body 60 and a valve assembly 62. Valve assembly 62 is assembled against a shoulder 66 on piston rod 34. Valve body 60 is assembled against valve assembly 62. A nut 68 secures these components to piston rod 34. Valve body 60 defines a plurality of fluid passages 70.

Valve assembly 62 comprises a backup washer 80, a valve body 82, a valve guide 84 and a biasing member 86. Backup washer 80 abuts shoulder 66 on piston rod 34, valve guide 84 abuts backup washer 80, biasing member 86 abuts valve guide 84 and valve body 60 abuts biasing member 86. This provides a solid metal connection between nut 68 and shoulder 66 on piston rod 34 to facilitate the tightening of nut 68.

Valve body 82 is slidingly received on valve guide 84 to move between a first position abutting backup washer 80 and a second position abutting valve body 60. A controlled restriction area 88 is formed between valve body 82 and valve body 60. Biasing member 86 engages an annular land formed on valve body 82 to bias valve body 82 towards its first position abutting backup washer 80. Valve body 82 covers the plurality of fluid passages 70 and when valve body 82 is in its first position abutting backup washer 80, the plurality of fluid passages 70 and controlled restriction area 88 are open. When valve body 82 is in its second position abutting valve body 60, the plurality of fluid passages 70 and controlled restriction area 88 are closed.

Figure 4:
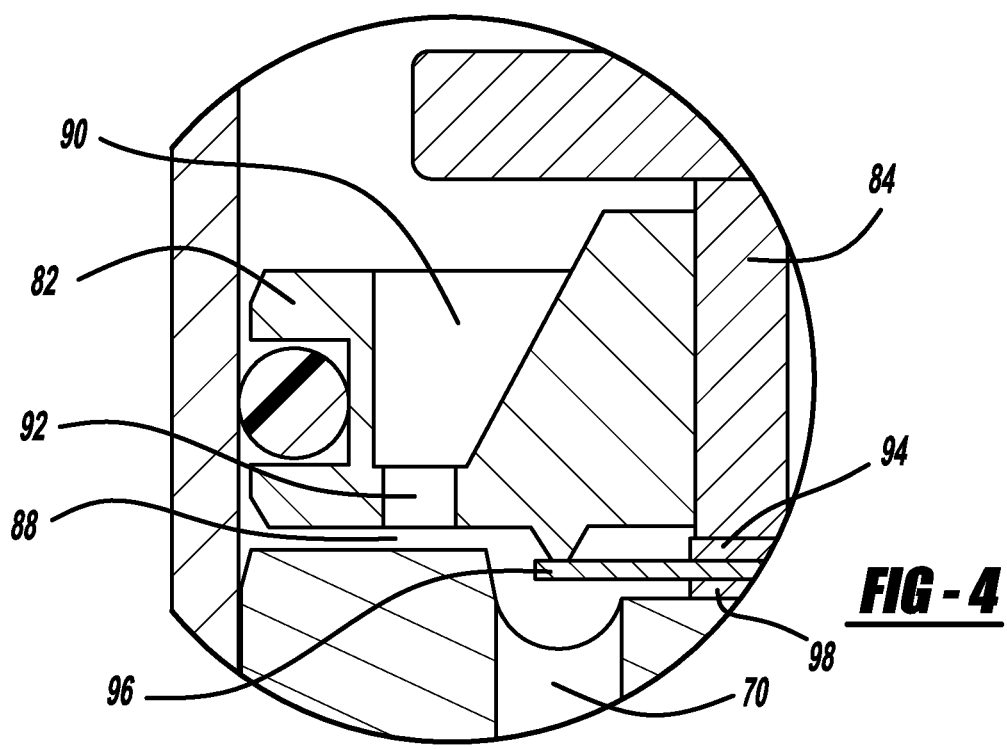
FIG. 4 is an enlarged view illustrating the velocity progressive valving concept of the present disclosure.

Valve body 82 includes a plurality of flow passages 90 and a plurality of valve orifices 92. Each of the plurality of flow passages 90 is associated with and in communication with a respective valve orifice 92 to define controlled restriction area 88 as illustrated in FIG. 4. A sealing member or O-ring seals the interface between valve body 82 and pressure tube 30.

As illustrated, biasing member 86 comprises a spacing disc 94, a biasing disc 96 and a spacing disc 98. Biasing disc 96 is designed to urge valve body 82 into its first position abutting backup washer 80. While biasing member 86 is illustrated as discs 94-98, it is within the scope of the present invention to utilize other biasing members known in the art.

During a rebound stroke of shock absorber 20, fluid within upper working chamber 44 flows through the plurality of flow passages 90, the plurality of valve orifices 92, controlled restriction area 88 and fluid passages 70 into lower working chamber 46. Initially, biasing member 86 urges valve body 82 into its first position towards backup washer 80 to open controlled restriction area 88 and a soft damping load is created. When fluid flow increases with the increase in the velocity of piston assembly 32, the pressure drop at controlled restriction area 88 will also increase causing the fluid pressure above valve body 82 to be higher than the fluid pressure below valve body 82. When the resultant force applied on valve body 82 exceeds the biasing load of biasing member 86, valve body 82 will begin to move towards its second position abutting valve body 60. This movement of valve body 82 will reduce the size of controlled restriction area 88 increasing the damping load created by shock absorber 20. Thus, during a rebound stroke, valve body 82 is progressively moving downward with increasing piston velocity.

Figure 6:
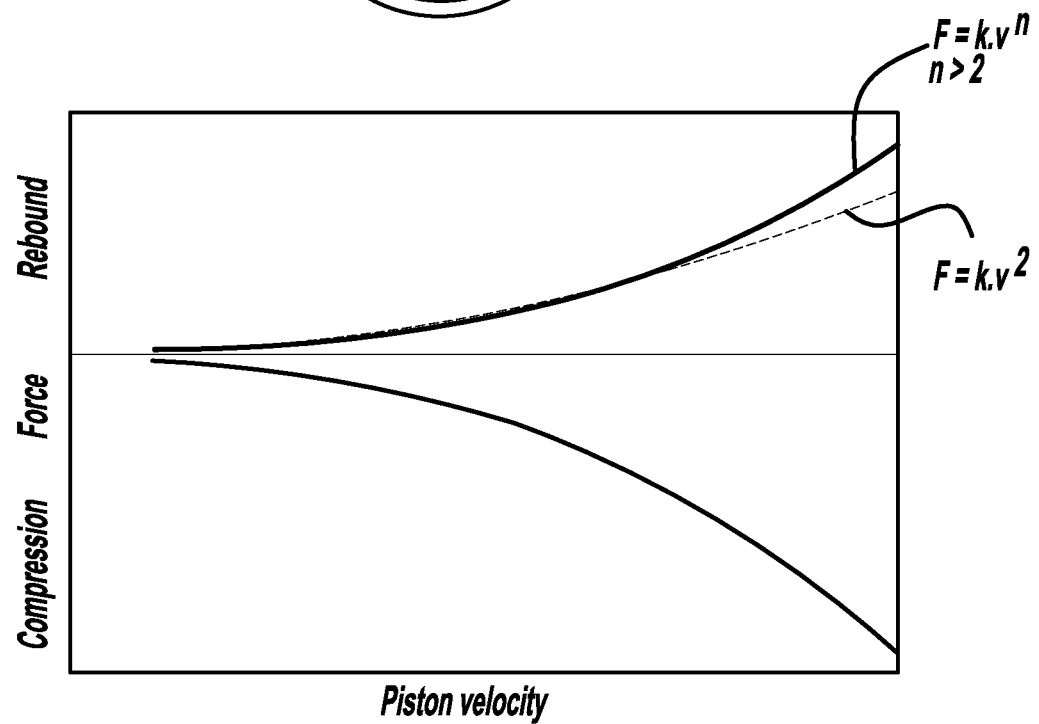
FIG. 6 is a graph of a damping curve achievable by the velocity progressive valving in accordance with the present disclosure.

FIG. 6 illustrates a graph of a damping curve achievable with valve assembly 62. A baseline curve where the force F is equal to $kv^2$, a polynomial degree of two, is illustrated as a dashed line. By properly sizing the components of valve assembly 62 including but not limited to the size of flow passages 90, the size of valve orifices 92, the size of restriction area 88 and the load characteristics of biasing member 86, a curve where the polynomial degree is greater than two, as illustrated by the solid curves, can be achieved with valve assembly 62.

Figure 5:
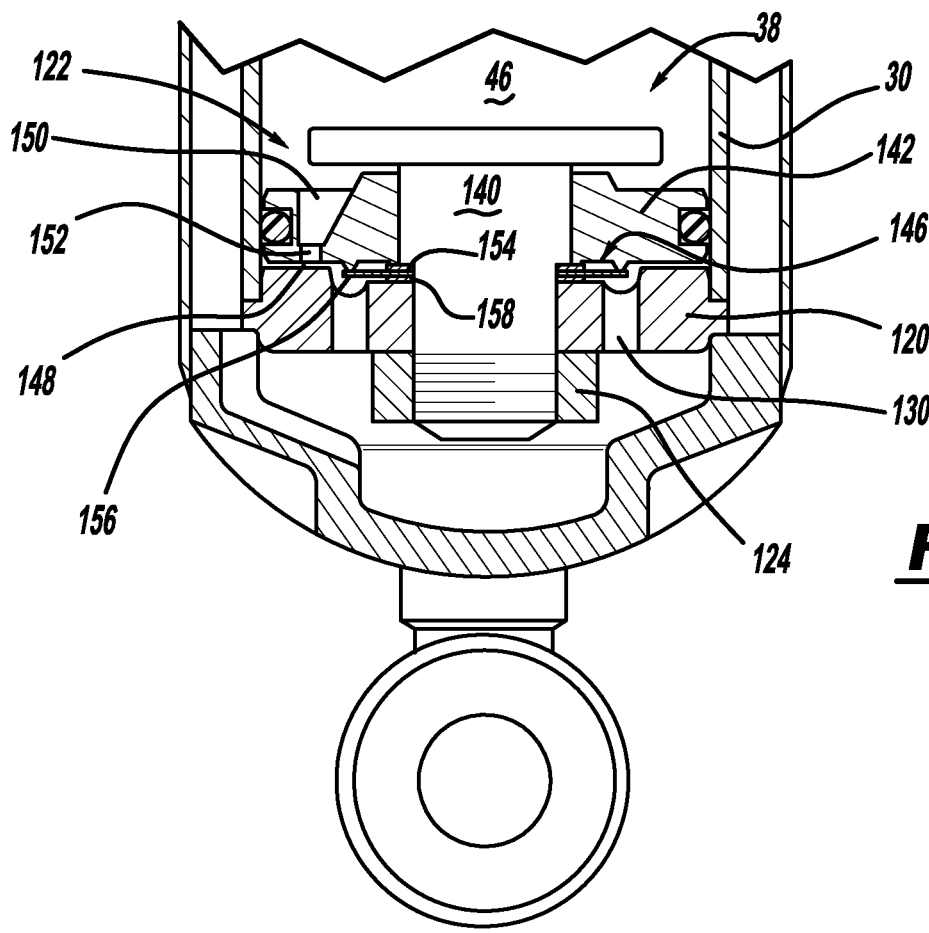
FIG. 5 is an enlarged cross-sectional view of the base valve assembly in accordance with the present disclosure.

Referring to FIG. 5, base valve assembly 38 comprises a valve body 120 and a valve assembly 122. Valve assembly 122 is assembled to valve body 120 and a nut 124 secures the two components. Valve body 120 defines a plurality of fluid passages 130.

Valve assembly 122 comprises a backup bolt 140, a valve body 142, and a biasing member 146. Biasing member 146 is disposed between a shoulder on backup bolt 140 and valve body 120 to provide a metal to metal contact for facilitate the tightening of nut 124.

Valve body 142 is slidingly received on backup bolt 140 to move between a first position abutting the flange on backup bolt 140 and a second position abutting valve body 120. A controlled restriction area 148 is formed between valve body 142 and valve body 120. Biasing member 146 engages an annular land formed on valve body 142 to bias valve body 142 towards its first position abutting the flange on backup bolt 140. Valve body 142 covers the plurality of fluid passages 130 and when valve body 142 is in its second position abutting valve body 120, the plurality of fluid passages 70 and controlled restriction area 148 are closed.

Valve body 142 includes a plurality of flow passages 150 and a plurality of valve orifices 152. Each of the plurality of flow passages 150 is associated with and in communication with a respective valve orifice 152 through controlled restriction area 148 as illustrated in FIG. 5. A sealing member or O-ring seals the interface between valve body 142 and pressure tube 30.

As illustrated, biasing member 146 comprises a spacing disc 154, a biasing disc 156 and a spacing disc 158. Biasing disc 156 is designed to urge valve body 142 into its first position abutting backup bolt 140. While biasing member 146 is illustrated as discs 154-158, it is within the scope of the present invention to utilize other biasing members known in the art.

During a compression stroke of shock absorber 20, fluid within lower working chamber 46 flows through the plurality of flow passages 150, the plurality of valve orifices 152, controlled restriction area 148 and fluid passages 130 into reservoir chamber 52. Initially, biasing member 146 urges valve body 142 into its first position towards the flange on backup bolt 140 to open controlled restriction area 148 and a soft damping load is created. When fluid flow increases with the increase in the velocity of piston assembly 32, the pressure drop at controlled restriction area 148 will also increase causing the fluid pressure above valve body 142 to be higher than the fluid pressure below valve body 142. When the resultant force applied on valve body 142 exceed the biasing load of biasing member 146, valve body 142 will begin to move towards its second position abutting valve body 120. This movement of valve body 142 will reduce the size of controlled restriction area 148 increasing the damping load created by shock absorber 20. Thus, during a compression stroke, valve body 142 is moving downward with progressively increasing piston velocity. Valve assembly 122 is thus similar to valve assembly 62 and it can also achieve the damping curve illustrated in FIG. 6.

Figure 7:
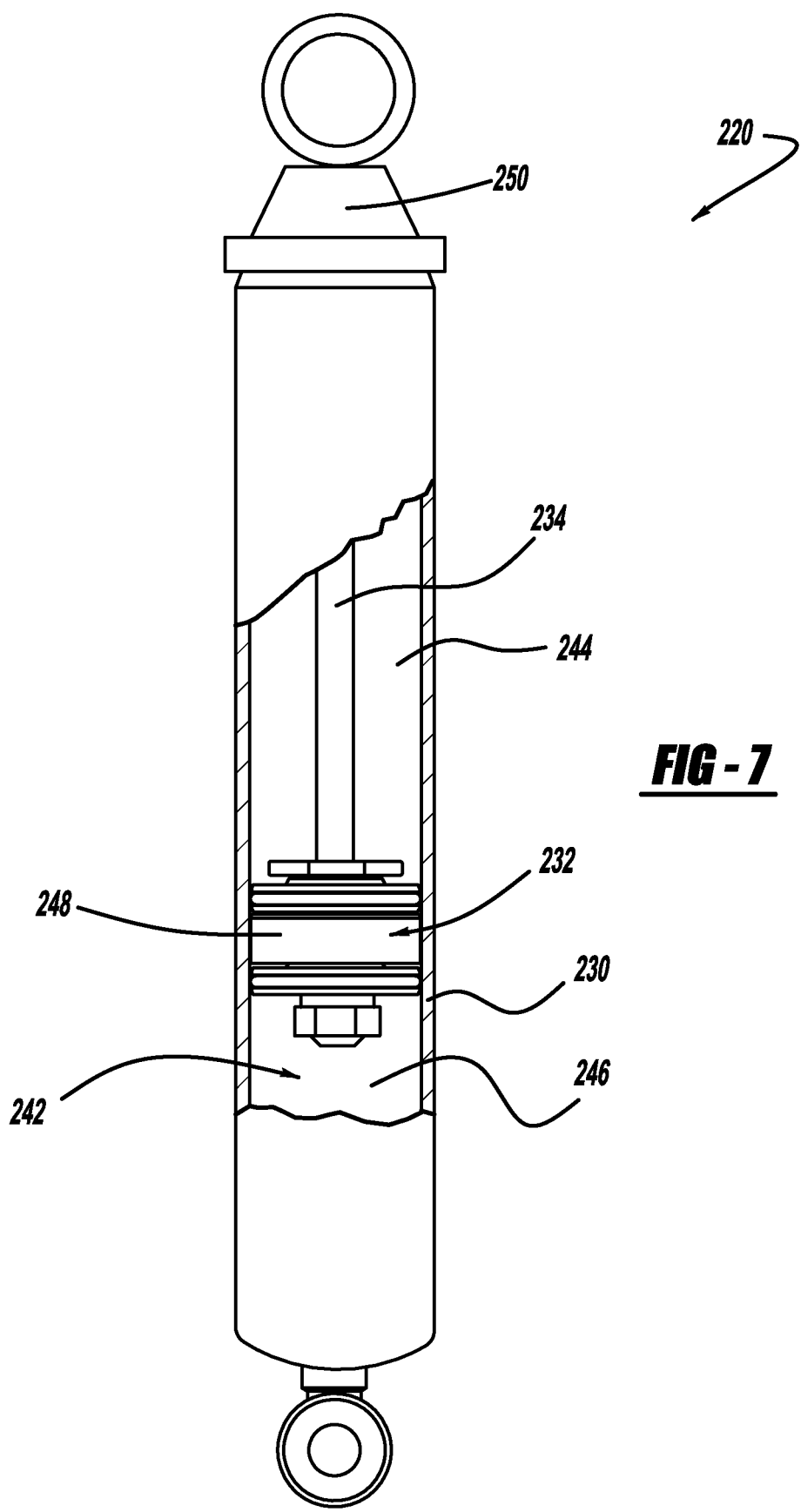
FIG. 7 is a side sectional view of a shock absorber in accordance with another embodiment of the present disclosure.
Figure 8:
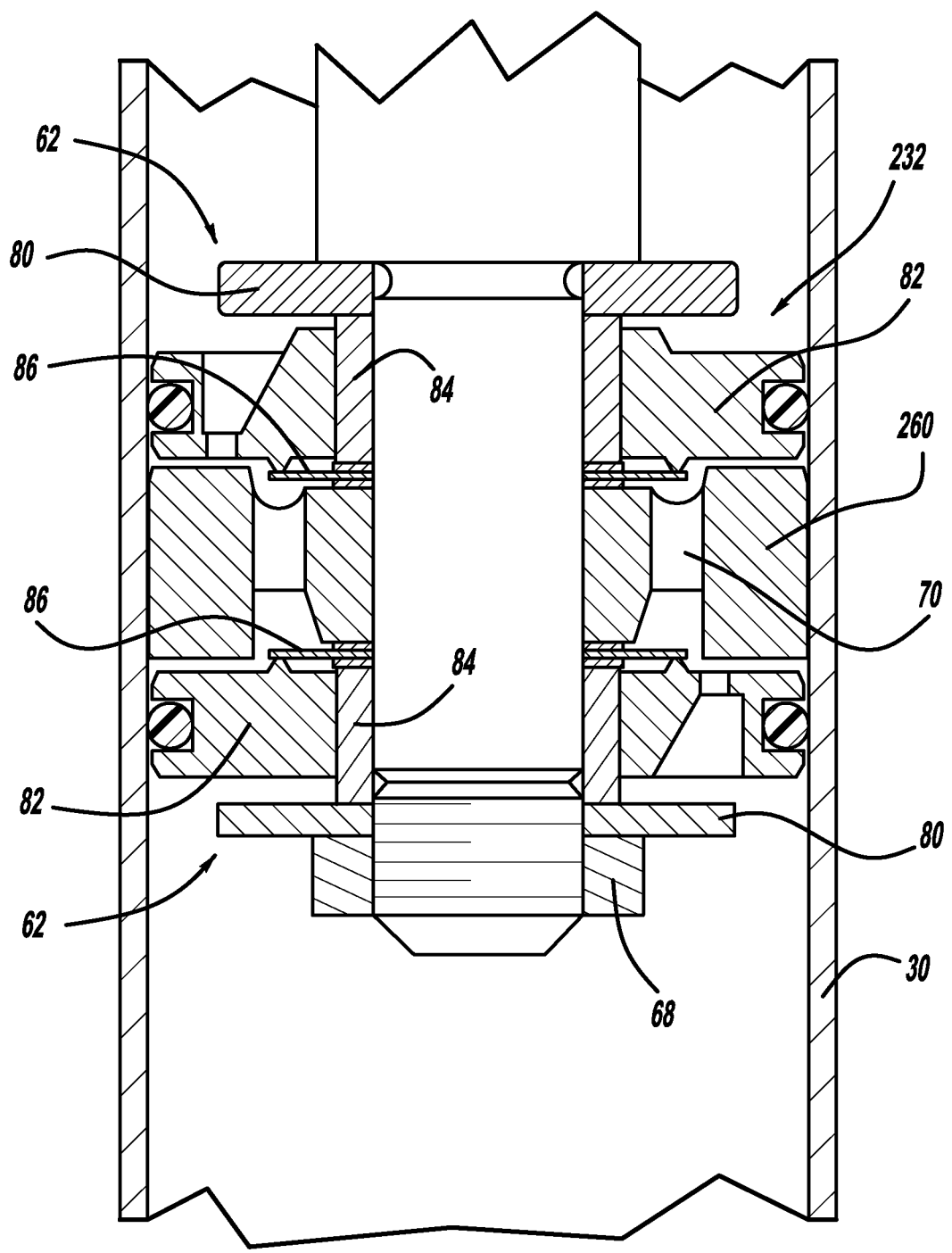
FIG. 8 is an enlarged cross-sectional view of the piston assembly illustrated in FIG. 7.

FIGS. 2-5 illustrate valve assembly 62 of piston assembly 32 and valve assembly 122 of base valve assembly 38 for a dual tube shock absorber. FIGS. 7 and 8 illustrate a monotube shock absorber 220 where two valve assembly 62 are utilized. Shock absorber 220 comprises a pressure tube 230, a piston assembly 232 and a piston rod 234.

Pressure tube 230 defines a working chamber 242. Piston assembly 232 is slidably disposed within pressure tube 230 and divides working chamber 242 into an upper working chamber 244 and a lower working chamber 246. A seal 248 is disposed between piston assembly 232 and pressure tube 230 to permit sliding movement of piston assembly 232 with respect to pressure tube 230 without generating undue frictional forces as well as sealing upper working chamber 244 from lower working chamber 246. Piston rod 234 is attached to piston assembly 232 and extends through upper working chamber 244 and through an upper end cap 250 which closes the upper end of pressure tube 230. A sealing system seals the interface between upper end cap 250, pressure tube 230 and piston rod 234. The end of piston rod 234 opposite to piston assembly 232 is adapted to be secured to the sprung portion of vehicle 10. Valving within piston assembly 232 controls the movement of fluid between upper working chamber 244 and lower working chamber 246 during movement of piston assembly 232 within pressure tube 230. Because piston rod 234 extends only through upper working chamber 244 and not lower working chamber 246, movement of piston assembly 232 with respect to pressure tube 230 causes a difference in the amount of fluid displaced in upper working chamber 244 and the amount of fluid displaced in lower working chamber 246. The difference in the amount of fluid displaced is known as the "rod volume" is accommodated by a second piston (not shown) disposed within pressure tube 230 as is well known in the art.

Referring to FIG. 8, piston assembly 232 comprises a valve body 260 and two valve assembly 62. Valve body 260 defines the plurality of fluid passages 70. Valve assembly 62 is described above and thus it will not be repeated here. The operation and function of valve assembly 62 located above valve body 260 is the same as that described above for a rebound stroke for valve assembly 62 and valve body 60. The operation and function of valve assembly 62 located below valve body 260 is the same as that described above for valve assembly 62 and valve body 60 but because this valve assembly 62 is located below valve body 260, it operates during a compression stroke rather than the rebound stroke described above similar to valve assembly 122 described above.

Figure 9:
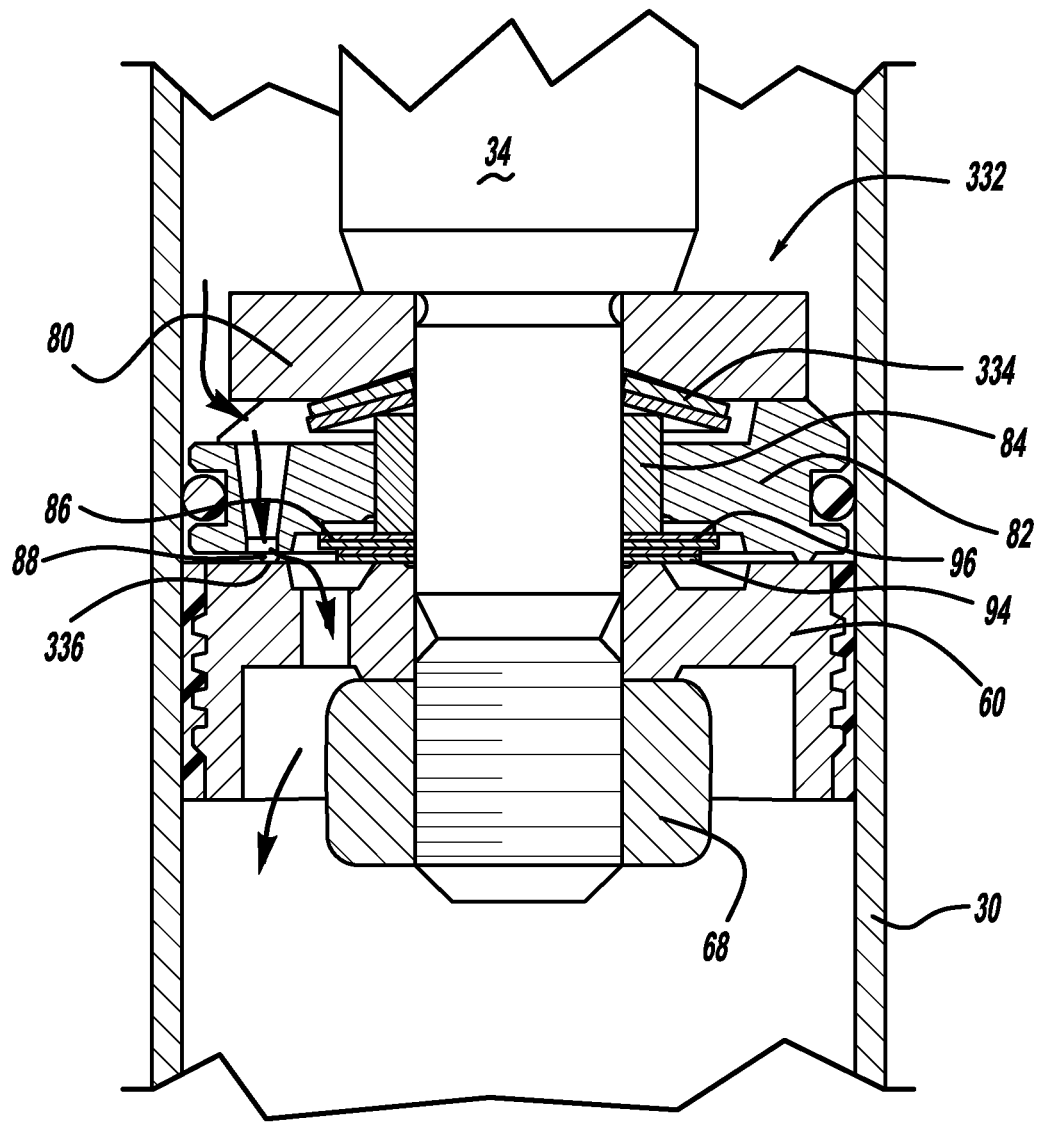
FIG. 9 is an enlarged view illustrating a velocity progressive valving concept in accordance with another embodiment of the present disclosure.

FIG. 9 discloses a piston assembly 332 in accordance with another embodiment of the present disclosure is illustrated. Piston assembly 332 is similar to piston assembly 32 illustrated in FIG. 3 except that a biasing member 334 is disposed between backup washer 80 and valve guide 84. The addition of biasing member 334 facilitates the tightening and retention of nut 68.

As illustrated, biasing member 86 comprises one or more spacing discs 94 and one or more biasing discs 96. Biasing discs 96 are designed to urge valve body 82 into its first position abutting backup washer 80. While biasing member 86 is illustrated as discs 94 and 96, it is within the scope of the present invention to utilize other biasing members known in the art. Also, valve body 82 illustrated in FIG. 9 includes a land 336 which prohibits the full closing of valve body 82 such that a minimum specified flow will always flow through restriction area 88. A similar land could also be incorporated into the design illustrated in FIGS. 2-7 and the design illustrated in FIG. 8. Also, if land 336 is eliminated, valve body 82 would engage valve body 60 to fully close controlled restriction area 88.

Piston assembly 332 can be substituted for any of the piston assemblies described in this disclosure.

Figure 10:
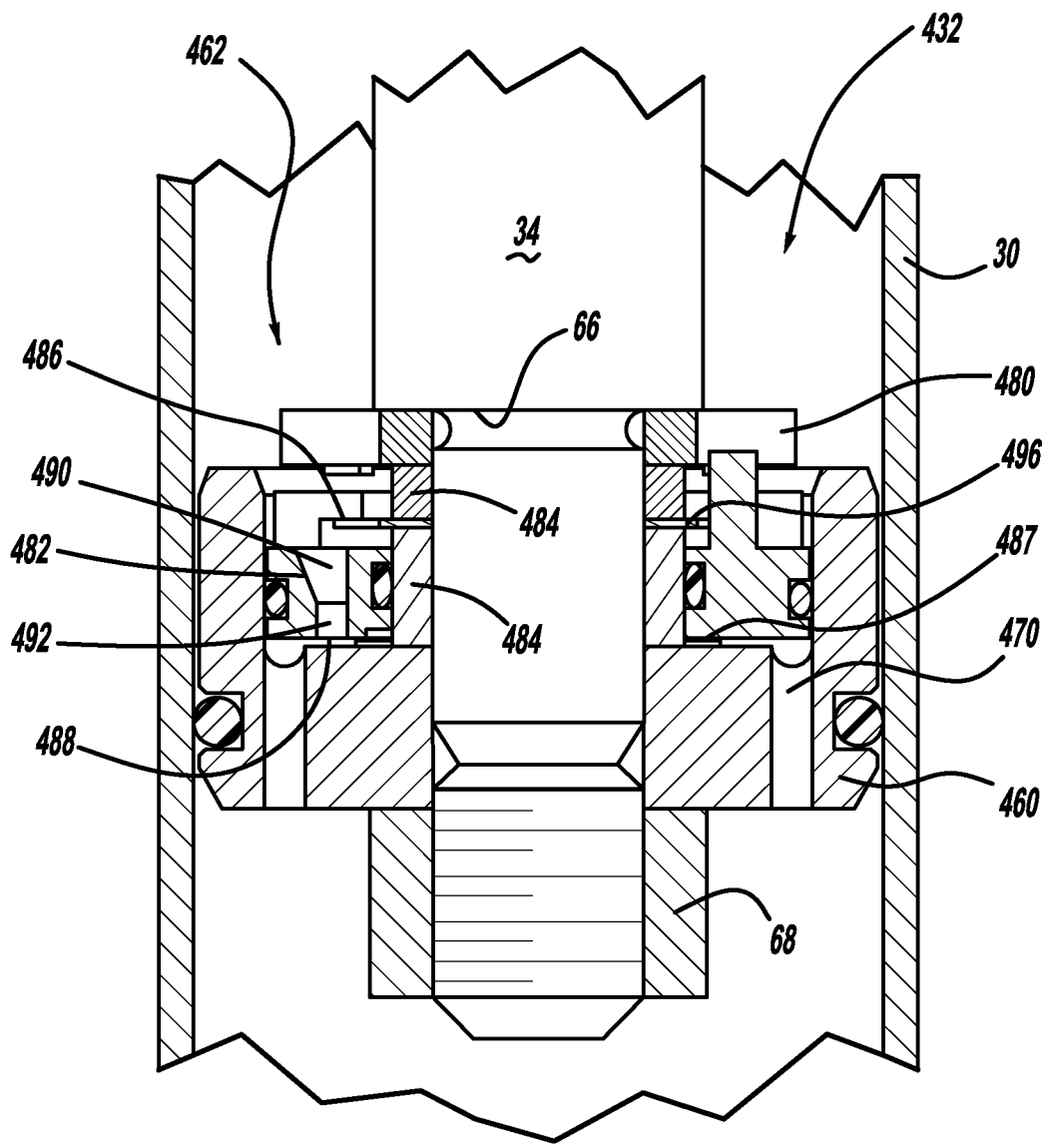
FIG. 10 is an enlarged view illustrating a velocity progressive valving concept in accordance with another embodiment of the present disclosure.

FIG. 10 discloses a piston assembly 432 in accordance with another embodiment of the present disclosure is illustrated. Piston assembly 432 comprises a valve body 460 and a valve assembly 462. Valve assembly 462 is assembled against shoulder 66 on piston rod 34. Valve body 460 is assembled against valve assembly 462. Nut 68 secures these components to piston rod 34. Valve body 460 defines a plurality of fluid passages 470.

Valve assembly 462 comprises a backup washer 480, a valve body 482, a two-piece valve guide 484 and a biasing member 486. Backup washer 480 abuts shoulder 66 on piston rod 34, two-piece valve guide 484 abuts backup washer 480, biasing member 486 is disposed between the two pieces of two-piece valve guide 484 and valve body 460 abuts two-piece valve guide 484. This provides a solid metal connection between nut 68 and shoulder 66 on piston rod 34 to facilitate the tightening of nut 68.

Valve body 482 is slidingly received on two-piece valve guide 484 to move between a first position abutting biasing member 486 and a second position abutting a spacer 487 disposed between valve body 482 and valve body 460. A controlled restriction area 488 is formed between valve body 482 and valve body 460. Biasing member 486 engages a plurality of fingers formed on valve body 482 to bias valve body 482 towards its first position abutting backup washer 480. Valve body 482 covers the plurality of fluid passages 470 and when valve body 482 is in its first position abutting biasing member 486, the plurality of fluid passages 470 and controlled restriction area 488 are open. When valve body 482 is in its second position abutting spacer 487, the plurality of fluid passages 470 and controlled restriction area 488 are at their minimum specified opening which is defined by spacer 487. If spacer 487 is omitted, valve body 482 would abut valve body 460 to close controlled restriction area 488.

Valve body 482 includes a plurality of flow passages 490 and a plurality of valve orifices 492. Each of the plurality of flow passages 490 is associated with and in communication with a respective valve orifice 492 to define controlled restriction area 488 as illustrated in FIG. 10. A sealing member or O-ring seals the interface between valve 482 and valve body 460.

As illustrated, biasing member 486 comprises only a biasing disc 496 but spacing discs 94 and 98 can be included. Biasing disc 496 is designed to urge valve body 482 into its first position abutting biasing member 482. While biasing member 486 is illustrated as disc 496, it is within the scope of the present invention to utilize other biasing members known in the art.

During a rebound stroke of shock absorber 20, fluid within upper working chamber 44 flows through the plurality of flow passages 490, the plurality of valve orifices 492, controlled restriction area 488 and fluid passages 470 into lower working chamber 46. Initially, biasing member 486 urges valve body 482 into its first position towards biasing member 486 to open controlled restriction area 488 and a soft damping load is created. When fluid flow increases with the increase in the velocity of piston assembly 432, the pressure drop at controlled restriction area 488 will also increase causing the fluid pressure above valve 482 to be higher than the fluid pressure below valve body 482. When the resultant force applied on valve body 482 exceed the biasing load of biasing member 486, valve body 482 will begin to move towards its second position abutting spacer 487. This movement of valve body 482 will reduce the size of controlled restriction area 488 increasing the damping load created by shock absorber 20. Thus, during a rebound stroke, valve body 482 is progressively moving downward with increasing piston velocity. Piston assembly 432 can be substituted for any of the piston assemblies described in this disclosure.

Figure 11:
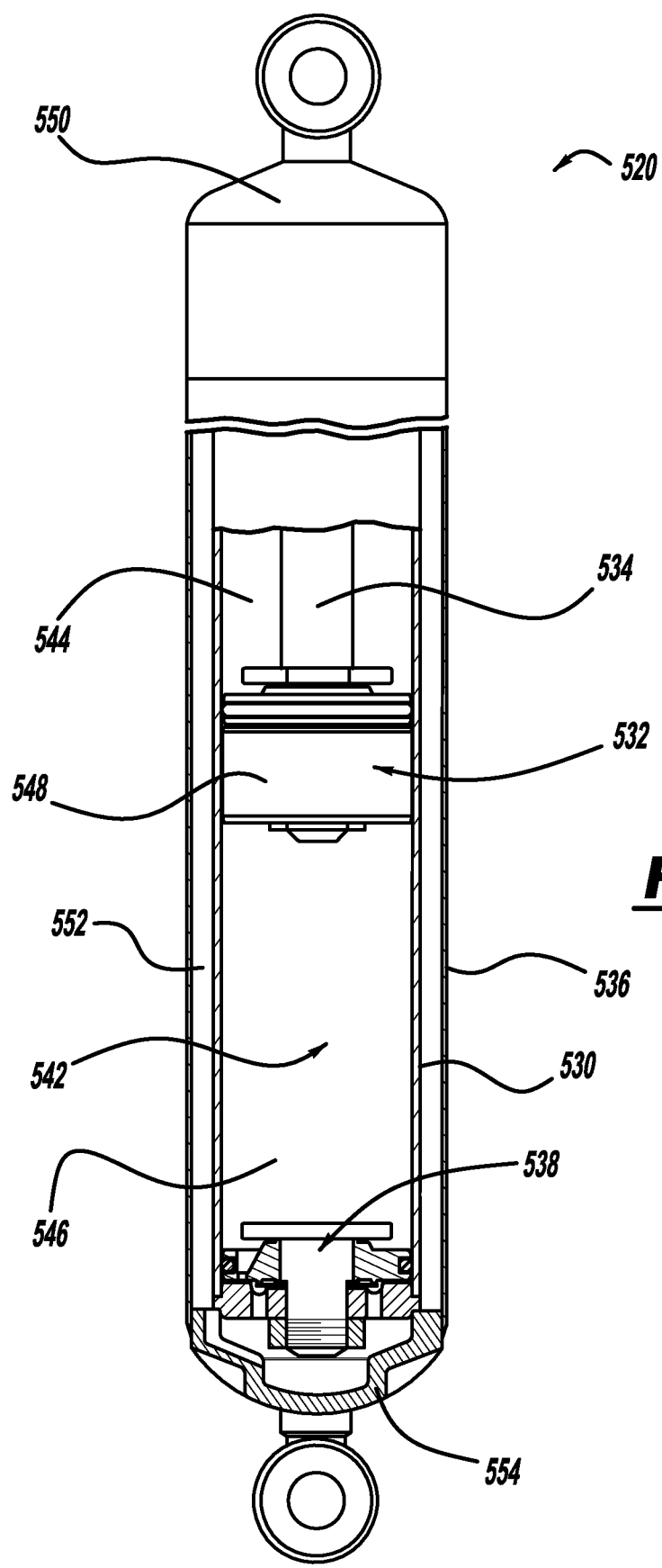
FIG. 11 is a side sectional view of the shock absorber in accordance with another embodiment of the present disclosure.

Referring now to FIG. 11, shock absorber 520 is shown in greater detail. While FIG. 11 illustrates only shock absorber 520, it is to be understood that shock absorber 26 could also includes the unique valve assembly described below for shock absorber 520. Shock absorber 26 only differs from shock absorber 520 in the manner in which it is adapted to be connected to the sprung and unsprung masses of vehicle 10. Shock absorber 520 comprises a pressure tube 530, a piston assembly 532, a piston rod 534, a reservoir tube 536 and a base valve assembly 538.

Pressure tube 530 defines a working chamber 542. Piston assembly 532 is slidably disposed within pressure tube 530 and divides working chamber 542 into an upper working chamber 544 and a lower working chamber 546. A seal 548 is disposed between piston assembly 532 and pressure tube 530 to permit sliding movement of piston assembly 532 with respect to pressure tube 530 without generating undue frictional forces as well as sealing upper working chamber 544 from lower working chamber 546. Piston rod 534 is attached to piston assembly 532 and extends through upper working chamber 544 and through an upper end cap 550 which closes the upper end of pressure tube 530. A sealing system seals the interface between upper end cap 550, reservoir tube 536 and piston rod 534. The end of piston rod 534 opposite to piston assembly 532 is adapted to be secured to the sprung portion of vehicle 10. Valving within piston assembly 532 controls the movement of fluid between upper working chamber 544 and lower working chamber 546 during movement of piston assembly 532 within pressure tube 530. Because piston rod 534 extends only through upper working chamber 544 and not lower working chamber 546, movement of piston assembly 532 with respect to pressure tube 530 causes a difference in the amount of fluid displaced in upper working chamber 544 and the amount of fluid displaced in lower working chamber 546. The difference in the amount of fluid displaced is known as the "rod volume" and it flows through base valve assembly 538.

Reservoir tube 536 surrounds pressure tube 530 to define a fluid reservoir chamber 552 located between tubes 530 and 536. The bottom end of reservoir tube 536 is closed by an end cap 554 which is adapted to be connected to the unsprung portion of vehicle 10. The upper end of reservoir tube 536 is attached to upper end cap 550. Base valve assembly 538 is disposed between lower working chamber 546 and reservoir chamber 552 to control the flow of fluid between chambers 546 and 552. When shock absorber 520 extends in length, an additional volume of fluid is needed in lower working chamber 546 due to the "rod volume" concept. Thus, fluid will flow from reservoir chamber 552 to lower working chamber 546 through base valve assembly 538 as detailed below. When shock absorber 520 compresses in length, an excess of fluid must be removed from lower working chamber 546 due to the "rod volume" concept. Thus, fluid will flow from lower working chamber 546 to reservoir chamber 552 through base valve assembly 538 as detailed below.

Figure 12:
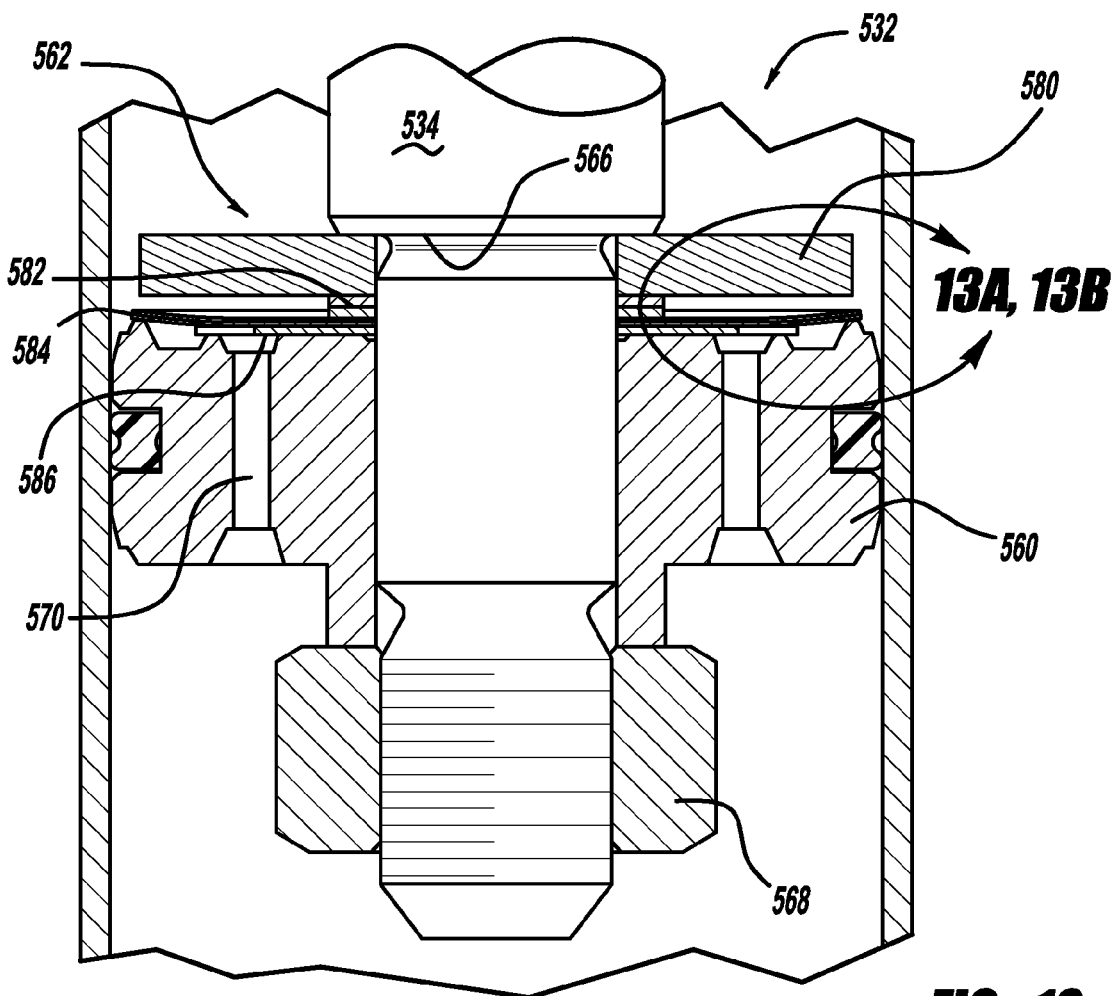
FIG. 12 is an enlarged cross-sectional view of the piston assembly in accordance with the embodiment of the present disclosure illustrated in FIG. 11.

Referring now to FIG. 12, piston assembly 532 comprises a valve body 560 and a valve assembly 562. Valve assembly 562 is assembled against a shoulder 566 on piston rod 534. Valve body 560 is assembled against valve assembly 562. A nut 568 secures these components to piston rod 534. Valve body 560 defines a plurality of fluid passages 570.

Valve assembly 562 comprises a backup washer 580, one or more spacer discs 582, one or more pilot discs 584 and one or more main discs 586. Backup washer 580 abuts shoulder 566 on piston rod 534, the one or more spacer discs 582 abut backup washer 580, the one or more pilot discs 584 abut spacer discs 582, the one or more main discs 586 abut pilot discs 584 and valve body 560 abuts main discs 586. This provides a solid metal connection between nut 568 and shoulder 566 on piston rod 534 to facilitate the tightening of nut 568.

Figure 13A:
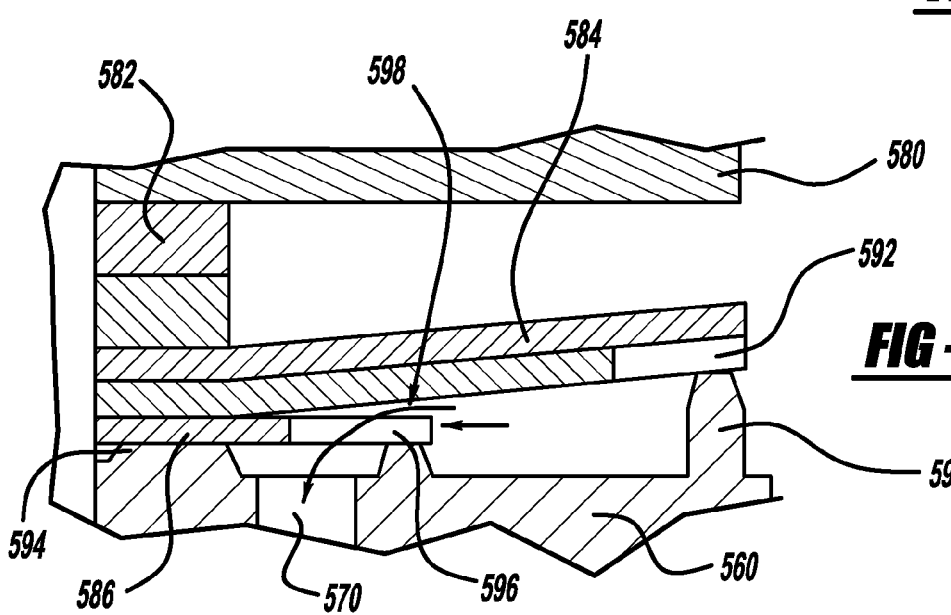
FIGS. 13A and 13B are enlarged views illustrating the velocity progressive valving concept of the present disclosure.

The pilot disc 584 immediately adjacent valve body 560 engages a piston land 590 formed on valve body 560. The pilot disc 584 engaging piston land 590 defines one or more notches 592 which enable fluid flow past piston land 590. The main disc 586 immediately adjacent valve body 560 engages a piston land 594 formed on valve body 560. The main disc 586 engaging piston land 594 defines one or more notches 596 which enable fluid flow past piston land 594. A controlled restriction area 598 is formed between pilot discs 584 and main discs 586 as is illustrated in FIG. 13A. Fluid is allowed to flow both axially and radially through the one or more notches 596 as illustrated in FIG. 13A.

Figure 13B:
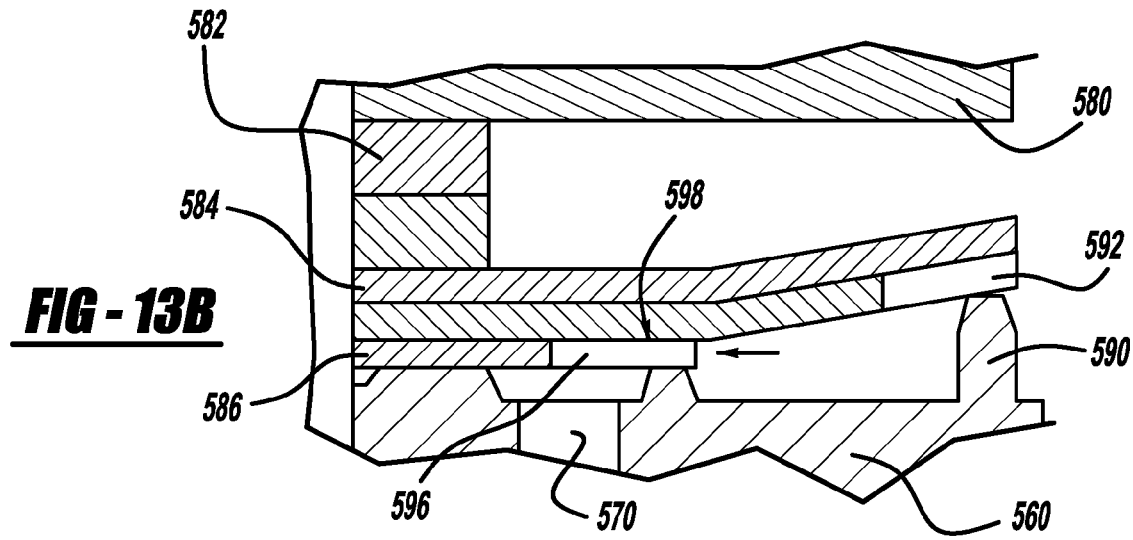

During a rebound stroke of shock absorber 520, fluid within upper working chamber 544 flows through the one or more notches 592, axially and radially through the one or more notches 596 and through passages 570 into lower working chamber 546. Initially, there is no deflection of the one or more pilot discs 584 and controlled restriction area 598 is open to allow for the axial and radial flow through the one or more notches 596 to produce a relatively soft damping load. When fluid flow increases with the increase in the velocity of piston assembly 532, the pressure drop at controlled restriction area 598 will increase causing the fluid pressure above the one or more pilot discs 584 to be higher than the fluid pressure below the one or more pilot discs 584. When the resultant force applied on the one or more pilot discs 584 exceeds the load required to deflect the one or more pilot discs 584, the one or more pilot discs 584 will deflect towards valve body 560 to close the axial pathway through the one or more notches 596 as illustrated in FIG. 13B. This deflection of the one or more pilot discs 584 will reduce the size of controlled restriction area 598 by eliminating the axial flow through the one or more notches 596 leaving only the radial flow increasing the damping load created by shock absorber 520. Thus, during a rebound stroke, the one or more pilot discs 584 progressively move downward with increasing piston velocity. The thickness of the one or more main discs will determine the minimum specified flow through the one or more notches 596. Valve assembly 562, similar to valve assembly 62, can also achieve the damping curve illustrated in FIG. 6.

Figure 14:
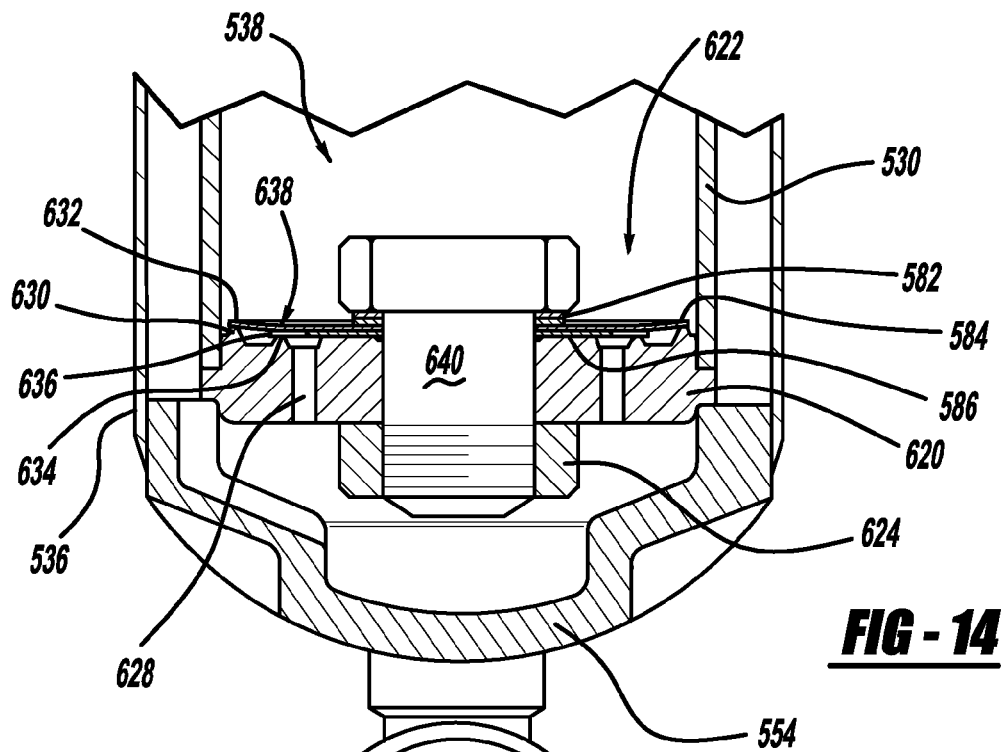
FIG. 14 is an enlarged cross-sectional view of the base valve assembly in accordance with the embodiment of the present disclosure illustrated in FIG. 11.

Referring to FIG. 14, base valve assembly 538 comprises a valve body 620 and a valve assembly 622. Valve assembly 622 is assembled to valve body 620 and a nut 624 secures the two components. Valve body 620 defines a plurality of fluid passages 628.

Valve assembly 622 comprises a backup bolt 640, one or more spacer discs 582, one or more pilot discs 584 and one or more main discs 586. The one or more spacer discs 582 abut backup bolt 640, the one or more pilot discs 584 abut spacer discs 582, the one or more main discs 586 abut pilot discs 584 and valve body 620 abuts main discs 586. This provides a solid metal connection between nut 624 and the head on backup bolt 640 to facilitate the tightening of nut 624.

The pilot disc 584 immediately adjacent valve body 620 engages a piston land 630 formed on valve body 620. The pilot disc 584 engaging piston land 630 defines one or more notches 632 which enable fluid flow past piston land 630. The main disc 586 immediately adjacent valve body 620 engages a piston land 634 formed on valve body 620. The main disc 586 engaging piston land 634 defines one or more notches 636 which enable fluid flow past piston land 634. A controlled restriction area 638 is formed between pilot discs 584 and main discs 586 similar to restriction area 598 illustrated in FIG. 13A. Fluid is allowed to flow both axially and radially through the one or more notches 636 the same as notches 596 illustrated in FIG. 13A.

During a compression stroke of shock absorber 520, fluid within lower working chamber 546 flows through the one or more notches 632, axially and radially through the one or more notches 636 and through passages 628 into reservoir chamber 552. Initially, there is no deflection of the one or more pilot discs 584 and controlled restriction area 638 is open to allow for the axial and radial flow through the one or more notches 636 to produce a relatively soft damping load. When fluid flow increases with the increase in the velocity of piston assembly 532, the pressure drop at controlled restriction area 638 will increase causing the fluid pressure above the one or more pilot discs 584 to be higher than the fluid pressure below the one or more pilot discs 584. When the resultant force applied on the one or more pilot discs 584 exceeds the load required to deflect the one or more pilot discs 584, the one or more pilot discs 584 will deflect towards valve body 620 to close the axial pathway through the one or more notches 636 similar to notches 596 illustrated in FIG. 13B. This deflection of the one or more pilot discs 584 will reduce the size of controlled restriction area 638 by eliminating the axial flow through the one or more notches 636 leaving only the radial flow increasing the damping load created by shock absorber 520. Thus, during a compression stroke, the one or more pilot discs 584 progressively move downward with increasing piston velocity. The thickness of the one or more main discs will determine the minimum specified flow through the one or more notches 596. Valve assembly 622, similar to valve assembly 62, can also achieve the damping curve illustrated in FIG. 6.

Figure 15:
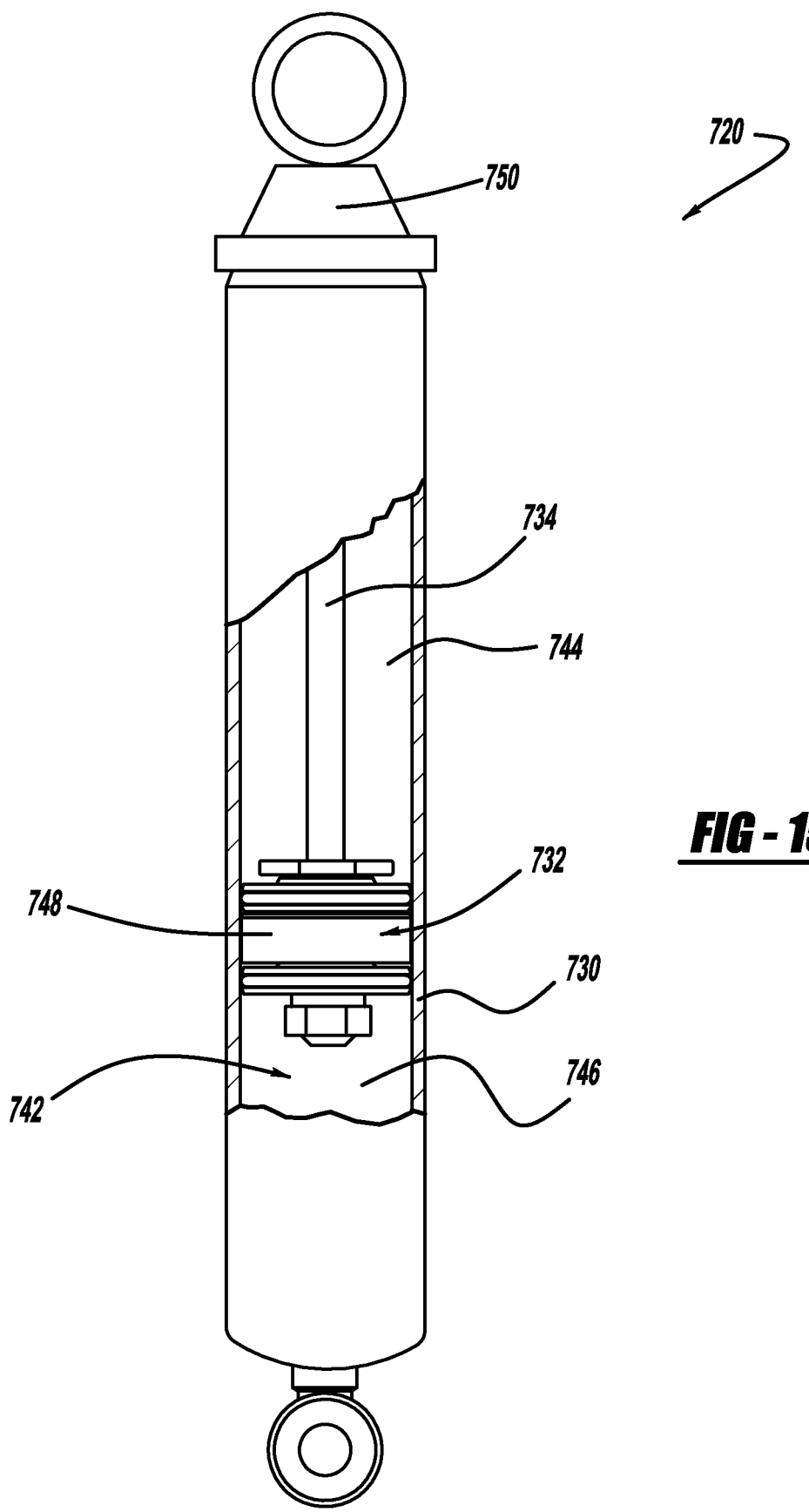
FIG. 15 is a side sectional view of a shock absorber in accordance with another embodiment of the present disclosure.
Figure 16:
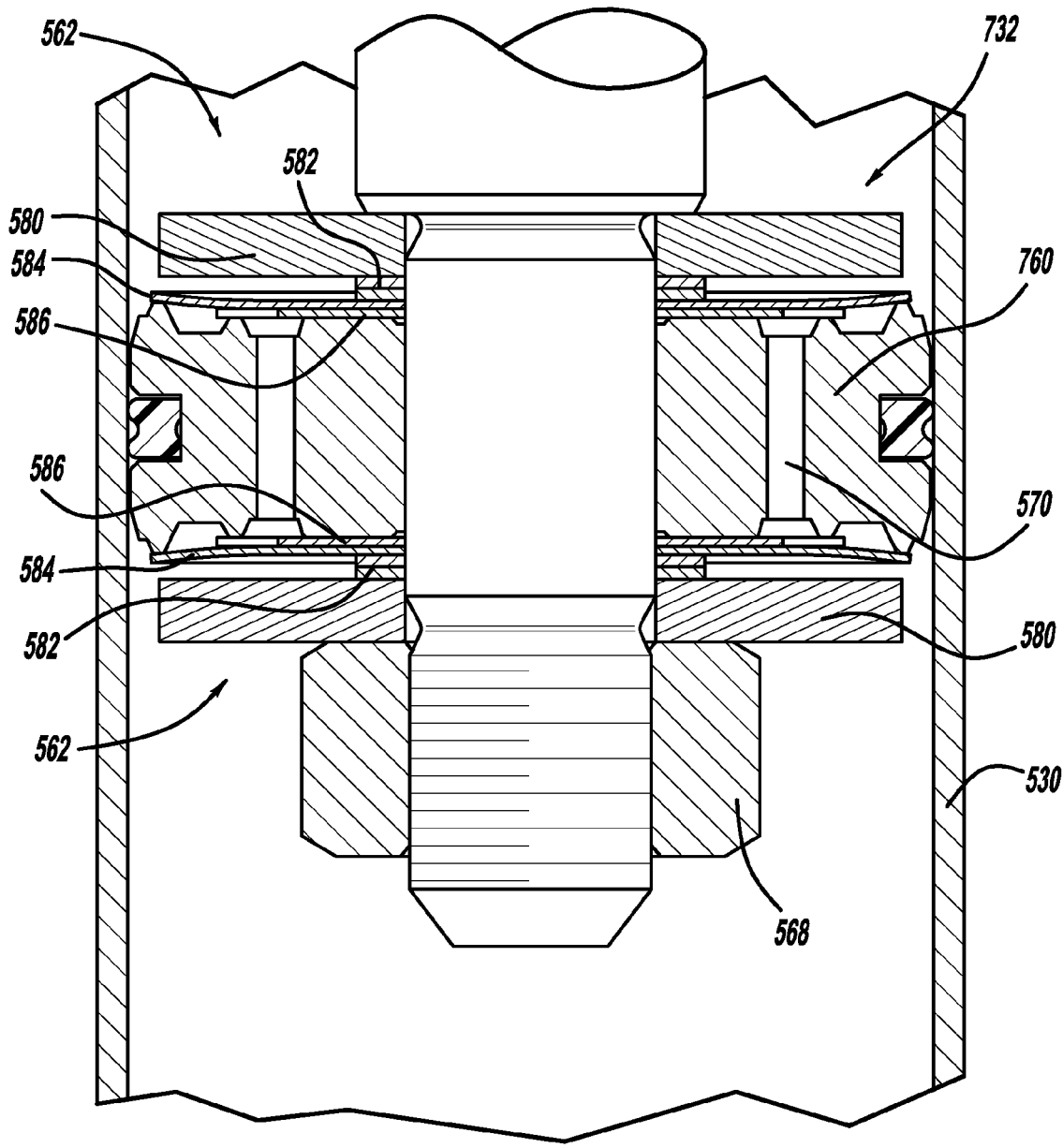
FIG. 16 is an enlarged cross-sectional view of the piston assembly illustrated in FIG. 15.

FIGS. 11-14 illustrate valve assembly 562 of piston assembly 532 and valve assembly 622 of base valve assembly 538 for a dual tube shock absorber. FIGS. 15 and 16 illustrate a monotube shock absorber assembly 720 where two valve assembly 562 are utilized. Shock absorber 720 comprises a pressure tube 730, a piston assembly 732 and a piston rod 734.

Pressure tube 730 defines a working chamber 742. Piston assembly 732 is slidably disposed within pressure tube 730 and divides working chamber 742 into an upper working chamber 744 and a lower working chamber 746. A seal 748 is disposed between piston assembly 732 and pressure tube 730 to permit sliding movement of piston assembly 732 with respect to pressure tube 730 without generating undue frictional forces as well as sealing upper working chamber 744 from lower working chamber 746. Piston rod 734 is attached to piston assembly 732 and extends through upper working chamber 744 and through an upper end cap 750 which closes the upper end of pressure tube 730. A sealing system seals the interface between upper end cap 750, pressure tube 730 and piston rod 734. The end of piston rod 734 opposite to piston assembly 732 is adapted to be secured to the sprung portion of vehicle 10. Valving within piston assembly 732 controls the movement of fluid between upper working chamber 744 and lower working chamber 746 during movement of piston assembly 732 within pressure tube 730. Because piston rod 734 extends only through upper working chamber 744 and not lower working chamber 746, movement of piston assembly 732 with respect to pressure tube 730 causes a difference in the amount of fluid displaced in upper working chamber 744 and the amount of fluid displaced in lower working chamber 746. The difference in the amount of fluid displaced is known as the "rod volume" is accommodated by a second piston (not shown) disposed within pressure tube 730 as is well known in the art.

Referring to FIG. 16, piston assembly 732 comprises a valve body 760 and two valve assembly 562. Valve body 760 defines the plurality of fluid passages 570. Valve assembly 562 is described above and thus it will not be repeated here. The operation and function of valve assembly 562 located above valve body 760 is the same as that described above for a rebound stroke for valve assembly 562 and valve body 560. The operation and function of valve assembly 562 located below valve body 760 is the same as that described above for valve assembly 562 and valve body 560 but because this valve assembly 562 is located below valve body 760, it operates during a compression stroke rather than the rebound stroke described above similar to valve assembly 622 described above.

Figure 17:
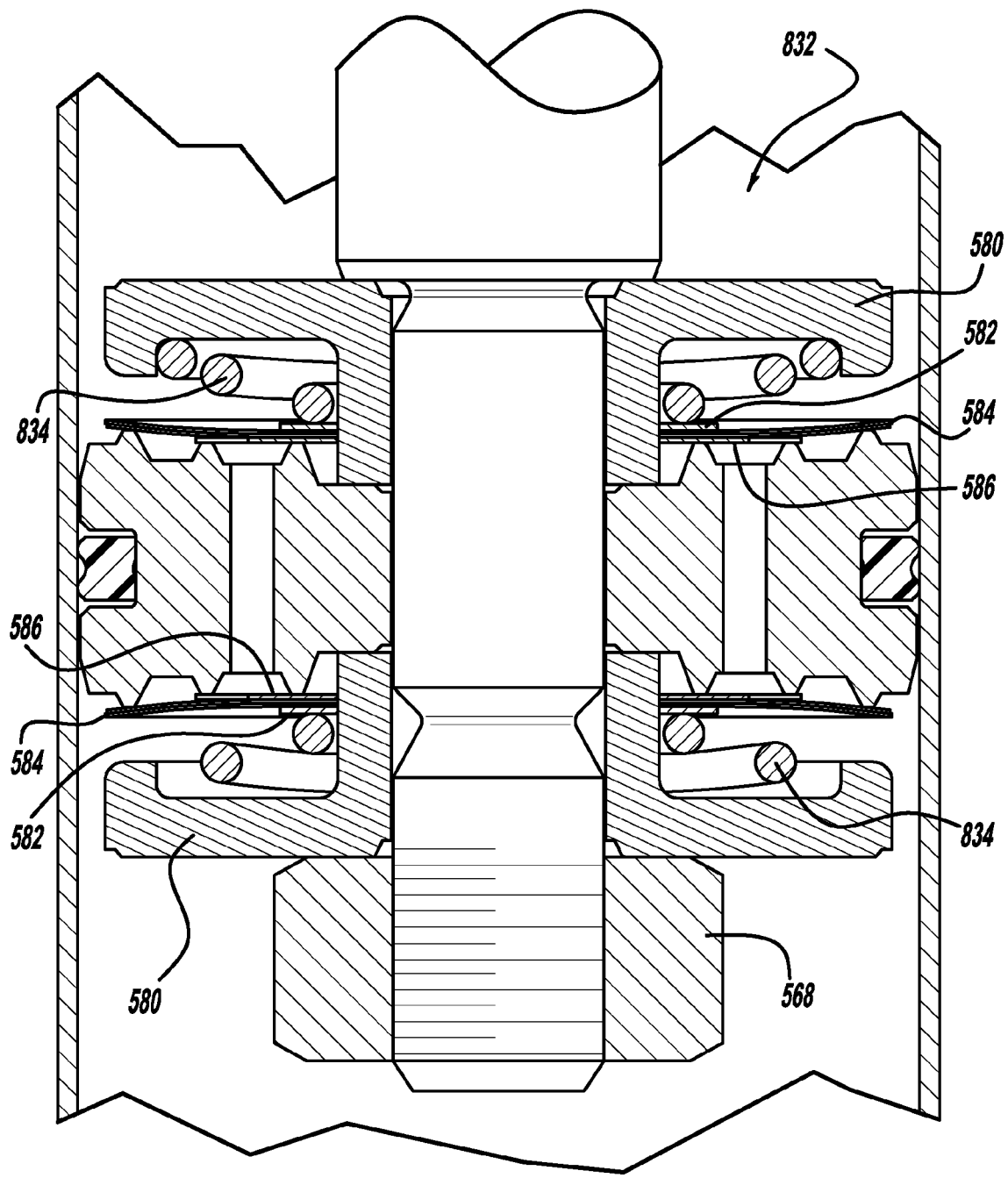
FIG. 17 is an enlarged view illustrating a velocity progressive valving concept in accordance with another embodiment of the present disclosure.
Figure 18:
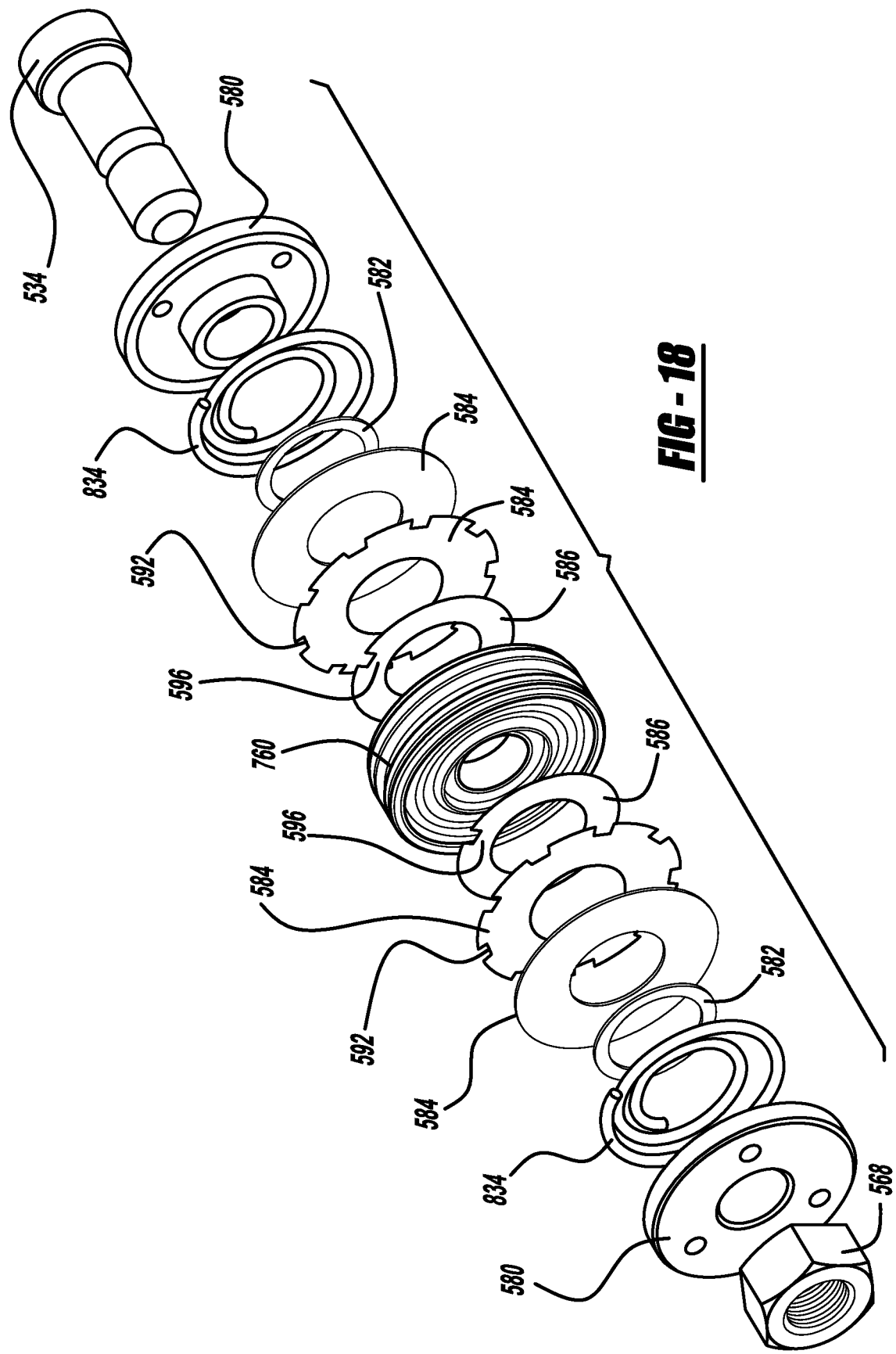
FIG. 18 is an exploded view of the velocity progressive valving concept illustrated in FIG. 17.

FIGS. 17 and 18 discloses a piston assembly 832 in accordance with another embodiment of the present disclosure is illustrated. Piston assembly 832 is similar to piston assembly 732 illustrated in FIG. 16 except that a biasing member 834 is disposed between back-up washer 580 and spacer disc 582 for both rebound and compression valving. The addition of biasing member 834 facilitates the tightening and retention of nut 568. Piston assembly 832 can be substituted for any of the piston assemblies described in this disclosure.

What is claimed is:
1. A shock absorber comprising:
a pressure tube forming a fluid chamber;
a first valve body disposed within said fluid chamber formed by said pressure tube, said first valve body dividing said fluid chamber into an upper working chamber and a lower working chamber, said first valve body defining a passage extending between said upper working chamber and said lower working chamber;
a piston rod attached to said first valve body, said piston rod extending through one end of said pressure tube;
a first valve assembly engaging said first valve body, said first valve assembly comprising:
a first main valve disc engaging said first valve body, said first main valve disc defining a first flow path and a second flow path, said second flow path being different than said first flow path;
a first pilot valve disc engaging said first valve body to define a chamber between said first pilot valve disc and said first valve body, said first pilot valve disc defining a third flow path extending from said chamber to one of said upper and lower working chambers between said first pilot valve disc and said first valve body, said first pilot disc being movable between a first position where said first and second flow paths are open and a second position where said first flow path is open and said second flow path is closed; wherein
said first flow path extends from said passage defined by said first valve body to said chamber between said first pilot valve disc and said first valve body;
said second flow path extends from said passage defined by said first valve body to said chamber between said first main valve disc and said first pilot valve disc.

2. The shock absorber according to claim 1, wherein fluid flow from said third flow path flows through said first and second flow paths.

3. The shock absorber according to claim 1, further comprising a second pilot valve disc engaging said first pilot valve disc, said second pilot valve disc defining said third flow path.

4. The shock absorber according to claim 1, wherein axial movement of an inner diameter of said first main valve disc with respect to said first valve body is prohibited.

5. The shock absorber according to claim 4, wherein axial movement of an inner diameter of said first pilot valve disc with respect to said first valve body is prohibited.

6. The shock absorber according to claim 1, wherein said first main valve disc and said first pilot valve disc are clamped between said first valve body and said piston rod.

7. The shock absorber according to claim 1, further comprising a biasing member urging said first main valve disc and said first pilot disc toward said first valve body.

8. The shock absorber according to claim 1, further comprising a second valve assembly engaging said first valve body, said second valve assembly comprising:
a second main valve disc engaging said first valve body, said second main valve disc defining a fourth and a fifth flow path between said second main valve disc and said first valve body;
a second pilot valve disc engaging said first valve body, said second pilot valve disc defining a sixth flow path between said second pilot valve disc and said first valve body, said second pilot disc being movable between a first position where said fourth and fifth flow paths are open and a second position where said fourth flow path is open and said fifth flow path is closed.

9. The shock absorber according to claim 8, wherein fluid flow from said third flow path flows through said first and second flow paths; and
fluid flow from said sixth flow path flows through said fourth and fifth flow paths.

10. The shock absorber according to claim 8, further comprising a third pilot valve disc engaging said first pilot valve disc, said third pilot valve disc defining said third flow path; and
a fourth pilot valve disc engaging said second pilot valve disc, said fourth pilot valve disc defining said fifth flow path.

11. The shock absorber according to claim 8, wherein axial movement of an inner diameter of said first and second main valve discs with respect to said first valve body is prohibited.

12. The shock absorber according to claim 11, wherein axial movement of an inner diameter of said first and second pilot valve discs with respect to said first valve body is prohibited.

13. The shock absorber according to claim 8, wherein said first and second main valve discs and said first and second pilot valve discs are clamped between said first valve body and said piston rod.

14. The shock absorber according to claim 8, further comprising a first biasing member urging said first main valve disc and said first pilot disc toward said first valve body; and
a second biasing member urging said second main valve disc and said second pilot disc toward said first valve body.

15. The shock absorber according to claim 1, further comprising:
a reserve tube surrounding said pressure tube to define a reserve chamber;

a base valve assembly disposed between said fluid chamber and said reserve chamber, said base valve assembly comprising:
- a second valve body defining a passage extending between said fluid chamber and said reserve chamber;
- a second main valve disc engaging said second valve body, said second main valve disc defining a fourth and a fifth flow path between said second main valve disc and said second valve body;
- a second pilot valve disc engaging said second valve body, said second pilot valve disc defining a sixth flow path between said second pilot valve disc and said second valve body, said second pilot disc being movable between a first position where said fourth and fifth flow paths are open and a second position where said fourth flow path is open and said fifth flow path is closed.

16. The shock absorber according to claim 15, wherein fluid flow from said third flow path flows through said first and second flow paths; and
fluid flow from said sixth flow path flows through said fourth and fifth flow paths.

17. The shock absorber according to claim 15, further comprising a third pilot disc engaging said first pilot disc, said third pilot disc defining said third flow path; and
a fourth pilot disc engaging said second pilot disc, said fourth pilot disc defining said sixth flow path.

18. The shock absorber according to claim 15, wherein axial movement of an inner diameter of said first main valve disc with respect to said first valve body is prohibited; and
axial movement of an inner diameter of said second main valve disc with respect to said second valve body is prohibited.

19. The shock absorber according to claim 18, wherein axial movement of an inner diameter of said first pilot valve disc with respect to said first valve body is prohibited; and
axial movement of an inner diameter of said second pilot valve disc with respect to said second valve body is prohibited.

20. The shock absorber according to claim 1, wherein:
the first main valve disc includes a slot defining said first flow path.

* * * * *